Sept. 9, 1969 CHU PING WANG 3,466,631
ASSOCIATIVE MEMORY DEVICE
Filed Dec. 7, 1966 3 Sheets-Sheet 1

STORED ZERO

STORED ONE

STORAGE FILM

READ FILM

INVENTOR
CHU PING WANG
BY Charles P. Boberg
ATTORNEY

FIG. 5A
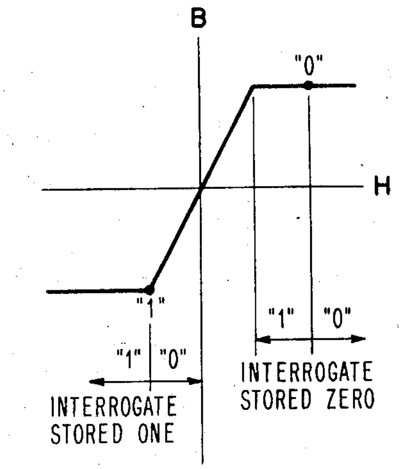
READ FILM A
(TRUE)
FIG. 5B
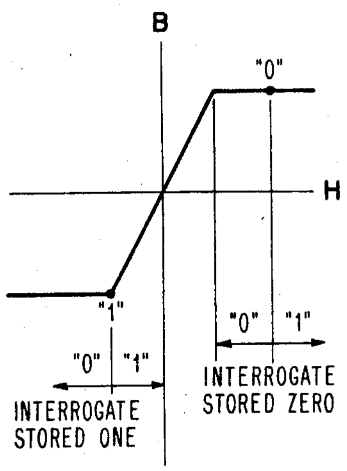
READ FILM A′
(COMPLEMENT)
FIG. 6
| INPUT | | | OUTPUT | |
|---|---|---|---|---|
| STORED BIT | | INTERROGATE | FILM A (LINE 20) | FILM A′ (LINE 20′) |
| TRUE | COMPLEMENT | | | |
| 0 | 1 | 0 | 0 | 0 |
| 0 | 1 | 1 | 0 | 1 |
| 1 | 0 | 0 | 1 | 0 |
| 1 | 0 | 1 | 0 | 0 |

United States Patent Office 3,466,631

Patented Sept. 9, 1969

3,466,631
ASSOCIATIVE MEMORY DEVICE

Chu Ping Wang, Putnam Valley, N.Y., assignor to International Business Machines Corporation, Armonk, N.Y., a corporation of New York Filed Dec. 7, 1966, Ser. No. 599,956
Int. Cl. G11b 5/00
U.S. Cl. 340—174 3 Claims This invention relates to associative memory devices which employ magnetic films as storage elements.

Figure 1A:
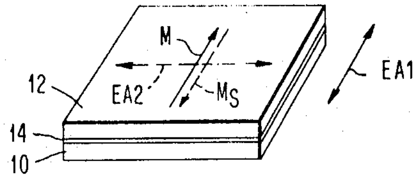

Associative memories, or "content-addressable" memories as they often are called, are adapted to match selected patterns of interrogating bits with the bit patterns of words stored in memory. By this technique it is possible to find a particular stored information word without knowing its location or "address" in the memory system. Associative memories are able to perform many useful functions, such as arithmetic operations, or the decoding of control bit patterns into signals on control lines which are selected according to the storage locations of the matching words. Another potential use of associative memories is in information retrieval work.

Prior associative memories have not been able to attain high operating speeds without a considerable sacrifice of storage capacity; or conversely, they have had to sacrifice speed if large storage capacity were desired. Moreover, such memories generally have not been well adapted for production by large-scale batch fabrication methods.

A general object of the present invention is to provide an improved associative memory construction that overcomes the disadvantages of prior associative memory schemes.

A further object is to provide an improved high-speed associative memory of economical design which utilizes magnetic film storage elements in such a way that they can be interrogated nondestructively in parallel-by-bit (as well as parallel-by-word) fashion so as to search the entire memory content in a single operating cycle.

A still further object is to provide an improved high-speed associative memory array that can be produced by batch fabrication techniques such as evaporation and electroplating.

The basic memory cell contemplated by this invention comprises a pair of magnetic films arranged in magnetostatically coupled relationship, one of these films being a storage film (also known as a "bias" film) having a high coercive force, and the other film being a read film (also known as a "soft" film) having a relatively low coercive force but also having a well-defined anisotropy. The respective easy axes of these films are disposed in orthogonal relationship, and the storage film normally biases the read film so that the latter is magnetized along its hard axis. The film pair is interrogated by applying to it a bit-disturb field which is directed one way or the other along the easy axis of the storage film (i.e., along the hard axis of the read film) according to whether the cell is being interrogated for a stored ONE or a stored ZERO. The bit storage cells are arranged in true and complement sets and are interrogated respectively with true and complement bit signals. The arrangement is such that mismatch signals of opposite senses will appear on different match detection lines so that they are unable to cancel each other on the same detection line (which would give a false match indication). Each storage film has properties such that its magnetization is not materially disturbed by the bit interrogating fields; hence it is able to restore the hard-axis magnetization of the associated read film following each interrogation thereof.

Figure 1B:
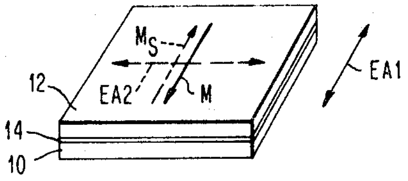

The foregoing and other objects, features and advantages of the invention will be apparent from the following more particular description of a preferred embodiment of the invention, as illustrated in the accompanying drawings wherein:

FIGS. 1A and 1B respectively illustrate the magnetic films of a memory cell as they may be employed in accordance with the invention to store ZERO and ONE, respectively.

Figure 2A:
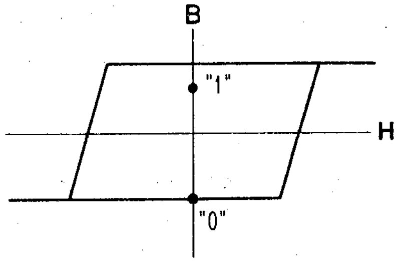
Figure 2B:
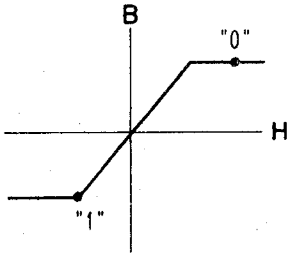

FIGS. 2A and 2B are graphs respectively depicting the pertinent magnetic characteristics of the storage and read films, respectively, in a memory cell of the type shown in FIG. 1A or 1B.

Figure 3:
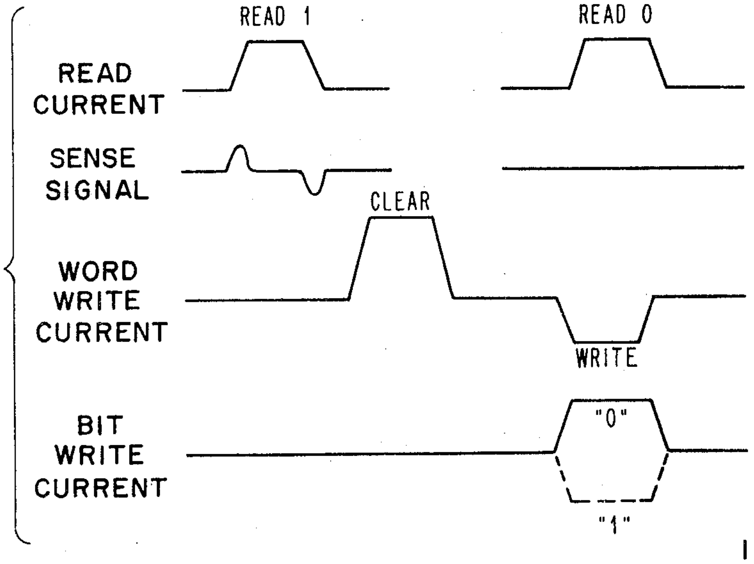

FIG. 3 comprises graphical representations of some signal waveforms which are involved in certain operations of the illustrated memory cells.

Figure 4:
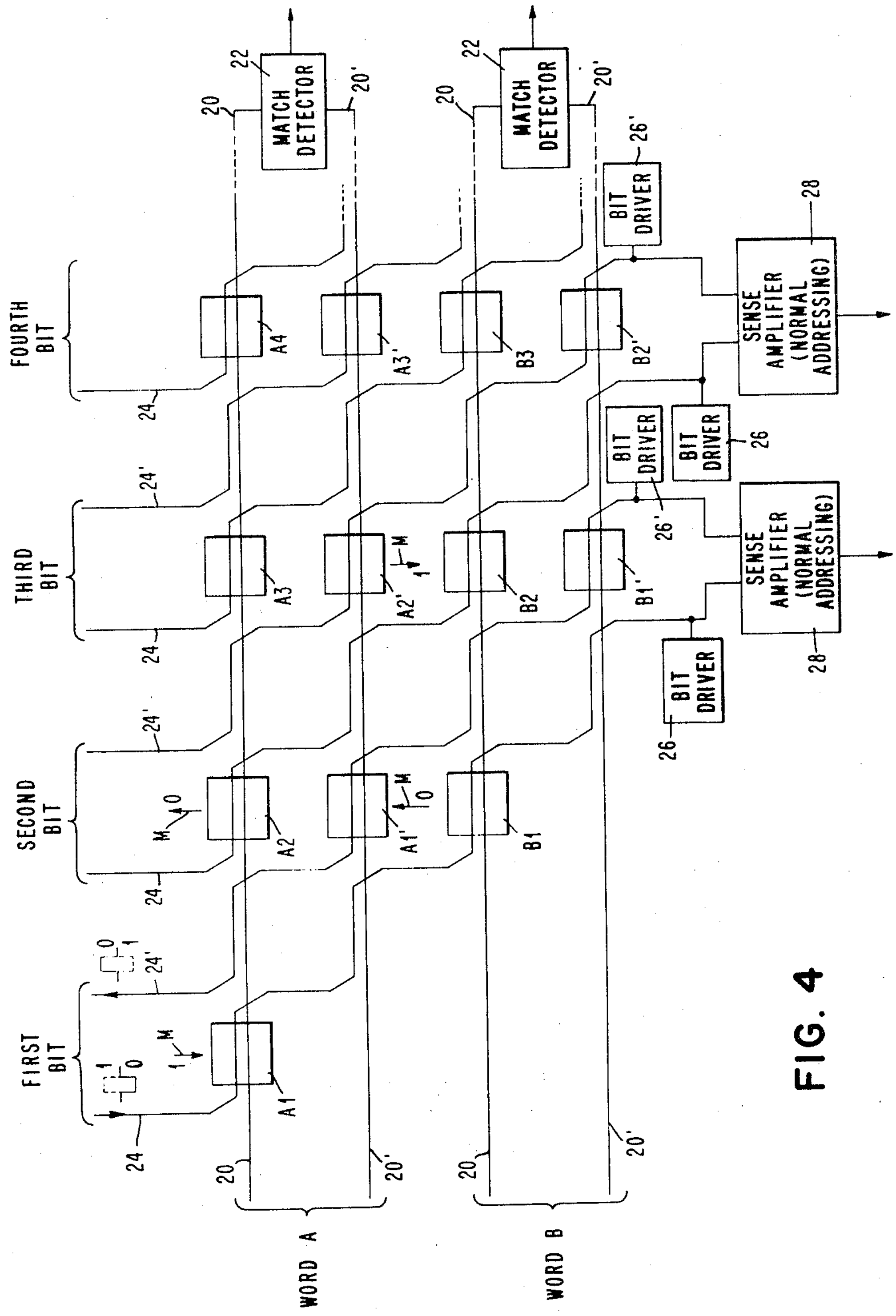

FIG. 4 is a schematic diagram illustrating the manner in which memory cells and their associated array lines may be arranged to provide either an associative memory or a normally addressable memory, as may be desired, in accordance with the invention.

FIGS. 5A and 5B, respectively, are graphs depicting the operations of the true and complement cells of an individual bit storage unit under various conditions of interrogation.

FIG. 6 is a tabular representation of the operations illustrated in FIGS. 5A and 5B.

The basic memory cell employed in the disclosed memory scheme includes a pair of superposed magnetic films 10 and 12, FIG. 1A or 1B, separated by a thin layer of insulation 14. The films 10 and 12 may be discrete film spots, as shown, or specific local areas of larger film sheets or strips. The magnetic materials of which these films are made may be nickel-iron or nickel-iron-cobalt alloys, for example. The bottom film 10 in this instance has a relatively high coercivity and is herein referred to as a "storage film," or sometimes as a "bias film." The top film 12 has relatively low coercivity and is referred to herein as a "read film," or sometimes as a "soft film." Both films 10 and 12 have well-defined anisotropic properties. Storage film 10 has an "easy" axis EA1 extending in the general direction of the solid-line arrow labeled as such in FIG. 1A or 1B. The read film 12 has an easy axis EA2 extending in the direction of the broken-line arrow designated as such in FIG. 1A or 1B. Each of the films 10 and 12 also has a "hard" axis, not labeled, which extends at right angles to its easy axis. The easy axis of each film defines the direction in which the magnetic dipoles of the magnetic material tend to align themselves when the film is not subjected to a magnetic field external to itself.

In its quiescent state the storage film 10 has a remanent magnetization $M_S$ which is directed one way or the other along the easy axis of this film as shown in FIG. 1A or 1B to represent a stored ZERO or a stored ONE as the case may be. The films 10 and 12 are magnetically coupled in such a way that the remanent magnetizations $M_S$ of the storage film 10 biases the magnetization M of the read film 12 into an antiparallel position, so that the two magnetization vectors $M_S$ and M close upon each other through the air gaps at the edges of these films. If desired, metallic magnetic edge closures may be provided for the coupled films. It will be noted that when the magnetization M of the read film 12 is biased by the magnetization $M_S$ of the storage film 10, the vector M lies along the hard axis of the read film 12, the respective magnetic properties of the two films being properly chosen to achieve this effect.

In the illustrated apparatus, each coupled-film memory cell is so operated that when this cell is storing a ZERO, the storage film 10 is in one of its two saturation states, with its magnetization $M_S$ extending in an arbitrarily chosen "negative" direction along the easy axis EA1 as shown in FIG. 1A. This condition is represented by the point labeled "0" in FIG. 2A, which shows the hysteresis loop or B-H characteristic of the storage film 10. When the cell is storing ONE, FIG. 1B, its magnetic state approaches positive saturation but need not achieve the fully saturated state. Thus, as indicated in FIG. 2A, the storage film 10 need be only partially magnetized, as designated by the point "1" in order to represent a stored ONE. Partial switching techniques of this kind are well known. One such technique will be described subsequently herein.

Whether the storage film 10 is in a state of negative saturation (ZERO) or partially-switched positive magnetization (ONE), the stray flux from this film is sufficient to bias the magnetization vector of the associated read film 12 fully into its hard-axis position in the opposite direction.

FIG. 2B represents the hard-axis magnetization characteristic of the read film 12. It may be noted that in the case of film 12, the ZERO state is a positive saturation state, with the film 12 being biased well into the positive saturation region of its B-H characteristic as indicated by the point "0" to represent the stored ZERO. The reason for this is that the read film 12 is magnetized antiparallel to the storage film 10, so that negative saturation of film 10 corresponds to positive saturation of film 12. To represent a stored ONE, the read film 12 is biased just barely into its negative saturation state, as indicated by the point "1" in FIG. 2B, due to the fact that the storage film 10 in this instance is only partially switched. The reason for the selection of these particular bistable operating points will become apparent presently.

An array of memory cells of the type described hereinabove, together with some of their associated array lines, is partially illustrated in FIG. 4. This figure does not show all of the circuitry which may be involved in the writing operations whereby binary information is stored initially in the various memory cells. Such writing circuitry is well-known and will be described herein only to the extent necessary for understanding the present invention. The instant description will deal primarily with the reading and sensing operations, assuming that the desired information already has been stored in the cells.

Each binary bit storage position in the illustrated memory array is represented by a pair of memory cells, such as A1 and A1', for example, each of these cells having a construction similar to that shown in FIG. 1A. The two cells of each pair respectively are adapted to store the true and complement forms of a selected binary digit. As an example, the pair of cells A1 and A1' may be magnetized in such a way that the cell A1 stores ONE while the cell A1' stores its complement, ZERO, or vice versa. For storing the digits of a single word, such as "Word A," FIG. 4, the "true" cells A1, A2, A3, etc. are arranged in one row, while the "complement" cells A1', A2', A3', etc. are arranged in a second row. A similar arrangement is followed in the case of the other word storage registers, such as the register for "Word B," for example. FIG. 4 does not illustrate all of the word registers and bit storage cells that may be employed in an actual array, which merely is a multiplication of the illustrated apparatus.

The true storage cells of a given word register, such as the register which stores Word A, for instance, are inductively coupled to a "true" match detection line 20 that extends at right angles to the magnetization vectors M of the various "true" memory cells as A1 in this row. Similarly, a "complement" match detector line 20' is inductively coupled to the "complement" storage cells such as A1' of its respective row, extending at right angles to the magnetization vectors M of these cells. It will be recalled that the vectors M indicate the quiescent magnetizations of the read films in the various cells. For present purposes, attention will be given only to the functioning of the read films in the various memory cells, since these are the only films that are apt to change state during an interrogation.

Each pair of match detection lines 20 and 20' terminates in a match detector 22, FIG. 4, which is in the nature of an OR gate. As will be explained in detail presently, no signals are produced on the detection lines 20 and 20' when each stored bit agrees with each interrogation bit, but where the bits of a stored word and those of an interrogation word are in disagreement, output signals may be produced on either or both of the detection lines 20 and 20' to produce mismatch signals at the output of the match detector 22.

In addition to being arranged in paired word rows, the memory cells also are arranged in paired bit lines or bit columns. Thus, the memory cells A1 and B1, for example, are arranged in a "true" bit column, and the memory cells A1' and B1' are arranged in a related "complement" bit column, both of these bit columns being associated with the first bit storage position of each word storage register. The bit columns are arranged in a staggered relationship as shown in FIG. 4 in order to provide noise cancellation, as will be explained presently.

Extending along each true bit column, such as the column including the storage cells A1 and B1, is a bit line such as 24. Extending along each complement bit column, such as the column including the cells A1' and B1', is a companion bit line 24'. Each bit line 24 is inductively associated with the "complement" memory cells of its column. When the memory is being operated in its content-addressing or associative memory mode, the lines 24 and 24' serve as bit interrogation lines. When the memory is operated in its normal addressable mode, the lines 24 and 24' function as bit lines during writing operations and as sense lines during reading operations, under which conditions they may be referred to as "bit sense lines." The wiring pattern of the lines 24 and 24' is designed to achieve the cancellation of capacitively coupled noises in accordance with well-known practice, thereby imparting a staggered appearance to the bit columns as shown in FIG. 4.

Associated with the bit lines 24 and 24' respectively are bit drivers 26 and 26', which are utilized during content-addressing operations for bit interrogating purposes and during writing operations for bit storage purposes. Also associated with each pair of bit lines 24 and 24' is a differential sense amplifier 28 which is utilized only during normal addressing operations, when a the bit lines 24 and 24' are functioning as sense lines. These bit drivers and sense amplifiers are selectively coupled and uncoupled from the bit lines as may be needed during change-overs from one type of operation to another.

ASSOCIATIVE MEMORY OPERATION

Before describing the content addressing or associative memory operations of the illustrated memory system in detail, it is well to analyze the operation of a particular storage device such as that shown in FIG. 1A or 1B under various content-addressing conditions. The mode of interrogation employed during content-addressing operations is such that each bit line 24 conducts a current pulse of one selected polarity whereas its related bit line 24' conducts a current pulse of the opposite polarity. The respective polarities of these interrogating pulses are indicated in FIGS. 5A and 5B, wherein "Read Film A (True)" corresponds, for example, to the read film of a storage cell such as A1, FIG. 4, while "Read Film A' (Complement)" corresponds to the read film of a storage cell such as A1', FIG. 4.

As explained hereinabove in connection with FIG. 2B, the read film of a memory cell which is storing a ZERO is biased well into positive saturation, whereas the read film of a cell which is storing ONE is biased just barely into negative saturation. The two read films of an associated pair of memory cells relating to the same bit storage position in memory are biased into opposite states. Thus, for example, if the stored bit is ONE, the "true" read film A is biased just to the verge of negative saturation as indicated by the point "1" in FIG. 5A. At the same time the "complement" read film A' is biased well into positive saturation, as indicated by the point "0" in FIG. 5B. Now let it be assumed that this pair of memory cells is being interrogated for the presence of a stored ZERO. In this connection reference is made first to FIG. 5A, and particularly to the legend "Interrogate stored ONE" therein. If the interrogating pulse is of ZERO polarity, there will be applied to the read film A a magnetic field indicated by the arrow "0" which extends to the right from the "1" point on the B-H characteristic, FIG. 5A. The application of this field causes a substantial reduction in the net magnetization of the read film A, thereby inducing an output voltage pulse on the associated detection line 20, FIG. 4.

Attention now will be given to the behavior of the associated read film A′ as depicted in FIG. 5B. Inasmuch as the true stored digit is ONE, the read film A′ will be magnetized in the opposite sense to its "0" state. Referring now to the legend "Interrogate stored ZERO" in FIG. 5B, the ZERO interrogation pulse on line 24′, FIG. 4, poduces an interrogating field extending in the direction of the arrow "0" in FIG. 5B from the point "0" on the B-H characteristic. The application of this interrogating pulse to the read film A′ does not produce any substantial change in the magnetic state thereof. Whereas this film initially was in a state of positive over-saturation, it is now brought merely to the verge of positive saturation, but assuming ideal characteristics as shown, this should not cause any substantial reduction of the net magnetization of this memory cell. Hence, no output pulse is induced in the associated detection line 20′, FIG. 4. Thus, the interrogation of a stored ONE for ZERO results in an output signal on detection line 20 but no output signal on detection line 20′. The arrangement is such that any mismatch signals induced in either detection line (or in both detection lines) will pass with equal facility through the detector 22 and be manifested at the output thereof.

FIG. 6 summarizes the manner in which the films A and A′ behave under different conditions of interrogation. This table should be read in connection with FIGS. 5A and 5B and also in conjunction with FIG. 4. The case where a stored ONE is interrogated for ZERO already has been considered, and it was noted that under these conditions an output signal is produced by film A on line 20, whereas the film A′ does not produce any output signal on the line 20′. On the other hand, if the stored digit had been ZERO and the interrogation digit had been ONE, an output signal would have been produced on detection line 20′ but not on detection line 20. In either case a mismatch signal is manifested by the detector 22, FIG. 4. If the stored bit matches the interrogation bit, no output signal is produced on either line 20 or 20′.

Attention now will be given to the common situation wherein mismatches of opposite senses occur in the same word storage register during a content addressing operation. Thus, referring to FIG. 4, let us assume that the pair of cells A1 and A1′ is storing ONE and is being interrogated for ZERO, whereas the next pair of cells A2 and A2′ is storing ZERO and is being interrogated for ONE, these two actions occurring simultaneously in the content-addressing operation. From FIG. 6 it can be seen that the interrogation of stored ZERO for ONE produces an output signal on the detection line 20′, whereas the interrogation of stored ONE for ZERO produces an output signal on the detection line 20. With this kind of an arrangement it is not possible for mismatch signals of opposite polarities to occur on the same match detection line and cancel each other to give a false match indication. Furthermore, all mismatch signals now have the same effective polarity and are passed with equal facility by the OR gate in the detector 22.

In the case of capacitively coupled noise signals, the technique of pulsing the related bit lines 24 and 24′ in opposite directions insures that every noise signal coupled into a detection line such as 24 or 24′ is counteracted by a noise signal of opposite polarity coupled simultaneously into the same line.

During an associative memory operation, all word registers in the memory are interrogated in parallel-by-bit fashion during a single search cycle. The various bit drivers 26 are selectively operated to apply ONE or ZERO pulses, as the case may be, to the related bit lines 24. At the same time, the associated bit drivers 26′ are selectively operated to apply pulses of opposite polarities to the associated bit lines 24′. (The sense amplifiers 28 are not utilized during an associative memory operation and are effectively disconnected at this time.) Wherever the interrogating bit agrees with the stored bit, no output signal will be produced on either of the associated detection lines 20 and 20′. Wherever mismatches do occur, however, signals will be induced on the lines 20 and 20′, as the case may be, in accordance with the table shown in FIG. 6. All output signals are compatible with each other insofar as their effects upon the match detectors 22 are concerned, so that any type of mismatch or any combination of mismatches will produce a mismatch signal at the associated match detector 22.

NORMAL ADDRESSING OPERATION

In a normal addressing operation, as distinguished from a content addressing or associative memory operation, a particular word register is selected for interrogation of its contents. During such an operation the match detectors 22 are disconnected, and the lines 20 and 20′ now may be employed as word interrogation lines. The information stored in the cells of a given word register can be read out nondestructively by applying a small field (much less than the switching threshold of the storage film) along the hard direction of the read films in this register. This is done by pulsing the selected pair of lines 20 and 20′ simultaneously in the same direction. Output signals now are induced in the bit lines 24 and 24′ (which in this instance function as sense lines), and such output signals act through the medium of the differential sense amplifiers 28 to produce bit sense signals at the respective terminals thereof.

The first two lines of FIG. 3 depict the action that takes place during a read operation. The polarity of the read current pulse is the same whether a ONE or ZERO is being read. Wherever a ONE is stored, the magnetization of the read film is opposed by the read field, and a sense signal results. Wherever a ZERO is stored, however, there is no net change in magnetization, and no sense signal is produced. Due to the fact that complementary digits always are stored in the two cells of each pair (e.g., cells A1 and A1′, FIG. 4) an output signal is induced in only one bit line of each pair, that is, the line 24 or 24′, whichever one happens to be coupled to the cell storing ONE. Depending upon whether the output signal appears on line 24 or 24′, the final output of the related differential sense amplifier 28 will be a sense signal of either one polarity or the other, representing a ONE or a ZERO as the case may be.

Noise signals that are capacitively coupled into each pair of sense lines 24 and 24′ by the read pulse will be common-mode signals; hence they are rejected by the differential sense amplifier 28 in accordance with well known practice.

Where information is to be written into a word storage register, a "clear" pulse first is sent through the word lines 20 and 20′ (or through separately provided word-write lines, if such are employed) in order to reset all of the memory cells associated therewith to their ZERO states. This clear pulse is followed in each instance by a word write pulse, as shown in FIG. 3. Coincidentally with the word write pulse, bit write pulses are sent through their corresponding bit lines to magnetize the storage films in accordance with the well-known coincident-current writing technique to the parallel-field mode. Where ZERO is to be written, the word write field and bit write field oppose each other without any net effect, since the cell already is magnetized in the desired manner. Where ONE is to be written, the word write and bit write fields combine to drive the storage film partially toward saturation (point "1" in FIG. 2A). At the same time the associated read film is driven to its ZERO state, but when quiescent conditions are restored, the read film switches back to its "1" state, FIG. 2B.

The disclosed memory scheme has many advantages. The structure of the individual memory cells is simple and is adaptable to batch fabrication techniques. Both the storage and read films of a memory cell can be thick films in order to increase the strength of the output signals. The mode of operation does not depend critically upon the skew and dispersion of the anisotropic magnetic films employed in these memory cells. Parallel-by-word and parallel-by-bit content addressing is feasible. Normal addressing operation also is readily available. No complicated switching or pulsing techniques are required to operate the array.

While the invention has been particularly shown and described with reference to a preferred embodiment thereof, it will be understood by those skilled in the art that various changes in form and details may be made therein without departing from the spirit and scope of the invention.

What is claimed is:

1. A magnetic memory array capable of being nondestructively interrogated comprising:

memory cells arranged in paired true and complement word rows and paired true and complement bit columns, each of said cells comprising first and second anisotropic magnetic films in magnetically coupled relationship with each other, the first film of each cell being a storage film with relatively high coercivity and having an easy axis that extends in the general direction of its word row, the second film of each cell being a read film with relatively low coercivity and having an easy axis that is substantially at right angles to the easy axis of the associated storage film, said read film having a hard axis substantially parallel with the easy axis of said storage film along which the magnetization of said read film is biased by the magnetizaton of said storage film, said films being adapted to store digital information in such fashion that said read film is biased well into saturation in one direction along its hard axis to store a given digital representation and is biased barely into saturation in the opposite direction along its hard axis to store the opposite digital representation, each bit storage position in the array containing a pair of said memory cells, one for storing a true representation of a given bit and another for storing a representation of its complement, each true bit representation being stored in a memory cell at the intersection of a true word row and a true bit column, and each complement bit representation being stored in a memory cell at the intersection of a complement word row and a complement bit column;

bit interrogating means including the following elements:

bit lines for the respective bit columns, each of said bit lines being inductively coupled to the memory cells of its respective column and extending across each of the respective read films thereof in a direction substantially paralleling the easy axis of such read film, and bit drivers for the respective bit lines arranged to pulse the respective bit line pairs in accordance with selected interrogation bits, the arrangement being such that the bit lines in the true bit column are energized to produce interrogating fields that are opposite to the interrogating fields respectively produced by the energized bit lines in the related complement bit columns;

and detection lines for the respective word rows, each of said detection lines being inductively coupled to the memory cells of its respective row for producing output signals in response to changes in the net magnetizations of such cells, thereby to indicate at least certain of the mismatches that may occur between the respective bit patterns of a stored word and an interrogation word.

2. A magnetic memory array as set forth in claim 1 including match detectors, one for each pair of true and complement word rows in the array, each of said detectors being adapted to receive output signals from the two detection lines in its respective true and complement word rows and to furnish mismatch signals in accordance therewith, said detection lines being so related to said memory cells that output signals received by each of said detectors from a true word row are compatible with the output signals received by such detector from a complement word row, thereby preventing the occurrence of false match indications whenever equal numbers of mismatches of opposite senses occur in the same stored word.

3. A nondestructive readout memory array of the type set forth in claim 1 wherein said detection lines also are adapted to serve as word interrogating lines, and said bit lines also are adapted to serve as bit sense lines.

References Cited

UNITED STATES PATENTS

| | | | |
|---|---|---|---|
| 3,179,928 | 4/1965 | Sorensen | 340—174 |
| 3,188,613 | 6/1965 | Fedde | 340—174 |
| 3,193,806 | 7/1965 | Pohm et al. | 340—174 |
| 3,195,108 | 7/1965 | Franck | 340—146.2 |
| 3,305,846 | 2/1967 | Amemiya | 340—174 |

BERNARD KONICK, Primary Examiner

K. E. KROSIN, Assistant Examiner